United States Patent
Hoffman et al.

(10) Patent No.: US 10,125,234 B2
(45) Date of Patent: Nov. 13, 2018

(54) CATALYST COMPOSITIONS AND METHODS FOR MAKING FOAM

(71) Applicant: EVONIK DEGUSSA GMBH, Essen (DE)

(72) Inventors: Robert Francis Hoffman, Alburtis, PA (US); James Douglas Tobias, Center Valley, PA (US); Jean Louise Vincent, Bethlehem, PA (US); Timothy J. Miller, Northampton, PA (US)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 14/632,037

(22) Filed: Feb. 26, 2015

(65) Prior Publication Data

US 2015/0240023 A1 Aug. 27, 2015

Related U.S. Application Data

(60) Provisional application No. 61/944,717, filed on Feb. 26, 2014.

(51) Int. Cl.
| | |
|---|---|
| C08G 18/16 | (2006.01) |
| C08J 9/14 | (2006.01) |
| C08G 18/79 | (2006.01) |
| C08G 18/09 | (2006.01) |
| C08G 18/22 | (2006.01) |
| C08G 18/42 | (2006.01) |
| C08J 9/00 | (2006.01) |
| C08J 9/12 | (2006.01) |
| C08G 101/00 | (2006.01) |

(52) U.S. Cl.
CPC ............ *C08J 9/141* (2013.01); *C08G 18/092* (2013.01); *C08G 18/225* (2013.01); *C08G 18/227* (2013.01); *C08G 18/42* (2013.01); *C08G 18/794* (2013.01); *C08J 9/0028* (2013.01); *C08J 9/0057* (2013.01); *C08J 9/12* (2013.01); *C08G 2101/0025* (2013.01); *C08J 2201/022* (2013.01); *C08J 2375/06* (2013.01)

(58) Field of Classification Search
CPC .. C08G 18/092; C08G 18/225; C08G 18/227; C08G 18/42; C08G 18/794; C08G 2101/0025; C08J 9/0028; C08J 9/0057; C08J 9/12; C08J 9/141; C08J 2201/022; C08J 2375/06
See application file for complete search history.

(56) References Cited

U.S. PATENT DOCUMENTS

| | | |
|---|---|---|
| 3,892,687 A | 7/1975 | Bechara et al. |
| 3,993,652 A | 11/1976 | Bechara et al. |
| 4,572,865 A | 2/1986 | Gluck et al. |
| 4,710,521 A | 12/1987 | Soukup et al. |
| 6,825,238 B2 | 11/2004 | Hohl et al. |
| 2004/0147626 A1 | 7/2004 | Hohl et al. |
| 2007/0259773 A1 | 11/2007 | Burdeniuc et al. |
| 2007/0259982 A1 | 11/2007 | Burdeniuc et al. |
| 2007/0259983 A1 | 11/2007 | Burdeniuc et al. |
| 2012/0121805 A1 | 5/2012 | Fishback et al. |
| 2012/0220677 A1 | 8/2012 | Williams et al. |
| 2015/0038653 A1* | 2/2015 | Borella ............ C08G 18/7621 525/459 |

FOREIGN PATENT DOCUMENTS

| | | |
|---|---|---|
| JP | 2005501940 A | 1/2005 |
| WO | 2012115936 A2 | 8/2012 |

* cited by examiner

*Primary Examiner* — Irina S Zemel
(74) *Attorney, Agent, or Firm* — Andrew H. Chung; Linda S. Li; Jason S. Ngui

(57) ABSTRACT

A composition and process to make polyisocyanurate or polyurethane foam using a catalyst composition comprising at least one bismuth carboxylate catalyst and one or more co-catalysts selected from the group of alkali metal carboxylates and quaternary ammonium carboxylate salts, such that the resultant foam has improved insulation properties. The polyisocyanurate or polyurethane foams produced by this catalyst composition and method are useful for laminated boardstock, construction panels, appliance insulation, and spray-applied insulation.

16 Claims, No Drawings

CATALYST COMPOSITIONS AND METHODS FOR MAKING FOAM

This application claims benefit of U.S. Application No. 61/944,717, filed on Feb. 26, 2014. The disclosure of Application No. 61/944,717 is hereby incorporated by reference.

FIELD OF THE INVENTION

The instant invention relates to catalyst compositions, composition comprising catalysts and methods for using the compositions for making foam.

BACKGROUND OF THE INVENTION

Polyisocyanurate and polyurethane foam, or PUR/PIR foam, is used in applications such as structural walls, roofs, refrigerator cabinets, and garage doors. One challenge faced by PUR/PIR foam formulators and manufacturers is to improve the insulation performance or efficiency of the PUR/PIR foam without increasing the foam thickness. Improving the insulation efficiency of the PUR/PIR foam is beneficial as it improves energy efficiency of the final wall, roof, or other product, and results in less PUR/PIR foam being required in the final product to achieve the desired energy efficiency.

Another challenge faced by PUR/PIR foam formulators and manufacturers is to increase the rate of production of the foamed product. Depending on the application processing specifics and the equipment being used to produce the PUR/PIR foam, the rate of manufacture of the foamed product is dependant on the total cure time of the PUR/PIR formulation. It is beneficial to shorten the total cure time, in order to increase commercial output in a given time period.

Conventional catalyst compositions and methods for making foams are described in the following patents and patent applications.

U.S. Pat. No. 4,572,865 describes a method for continuously producing an insulation board comprising a rigid plastic foam core having two major surfaces and a facing material on one or both of the major surfaces, the method including conveying a facing material along a production line, depositing a partially expanded froth foam of a plastic mixture, which contains at least one frothing agent, on the facing material, and further expanding and curing the froth foam in contact with the facing material to form the insulation board.

U.S. Pat. No. 4,710,521 describes a method whereby rigid polyisocyanurate foams are prepared by (a) bringing together on a continuously advancing conveyor an organic polyisocyanate, a minor amount of a polyester polyol, a blowing agent, and, in an organic solvent, a catalyst mixture comprising: (i) a salt of a low molecular weight carboxylic acid selected from the group consisting of an alkali metal salt and an alkaline earth metal salt and mixtures thereof, and (ii) a tertiary amine, the amount of the salt of the low molecular weight carboxylic acid being sufficient and the molecular weight of the carboxylic acid of the salt being sufficiently low to provide a firm foam having a non-friable surface and (b) foaming the foam forming mixture.

U.S. Pat. No. 3,892,687 describes catalysts having a formula for the production of polyurethane resins.

U.S. Pat. No. 3,993,652 describes catalysts that, when prepared in the absence of water, are stable to heat and storage and show high activity in reactions involving organic isocyanates, such as in the production of polyurethane and polyisocyanurate resins.

U.S. Pat. No. 2007/0,259,773 provides trimerization catalyst compositions and methods to produce a polyisocyanurate/polyurethane (PIR/PUR) foam using such trimerization catalyst compostions. The catalyst composition is the product of at least one alpha-beta unsaturated carboxylate salt and at least one second carboxylate salt.

U.S. Pat. No. 2007/0,259,982 provides trimerization catalyst compositions having an alpha-beta unsaturated carboxylate salt and methods to produce a polyisocyanurate/polyurethane foam using such trimerization catalyst compositions.

U.S. Pat. No. 2007/0,259,983 provides trimerization catalyst compositions having a sterically hindered carboxylate salt and methods to produce a polyisocyanurate/polyurethane (PIR/PUR) foam using such trimerization catalyst compositions.

U.S. Pat. No. 6,825,238 relates to rigid foams formed by the catalytic reaction of an aromatic polyisocyanate, a polyols, and a blowing agent and a process for preparing such polyisocyanate.

The previously identified patents and patent applications are hereby incorporated by reference.

BRIEF SUMMARY OF THE INVENTION

The instant invention solves the foregoing deficiencies and problems by providing a catalyst composition comprising a combination of at least one bismuth carboxylate salt and at least one or more of an alkali metal-based carboxylate salt and a quaternary ammonium-based carboxylate salt, as well as methods for using the catalyst composition for making a polyurethane foam (e.g., a PUR/PIR insulating foam). The instant invention results in foam products having beneficial properties including faster cure profiles, increased production rates, decreased foam cell size, and increased R-value in comparison to other foams made with conventional catalyst systems. R-value is reported in $(ft^2 \cdot °F \cdot hr/Btu)$ and is measured by LaserComp, Inc.'s Fox 200 heat flow meter, according to ASTM C518.

Another benefit of this invention is that the catalyst composition is thermally stable at the temperatures at which foams are made, thereby yielding products with no amine odor. By thermally stable, it is meant that at temperatures of at least 100 C, at least 125 C and in some cases up to 150° C., the catalyst does not decompose into volatile amine by-products (e.g., oxides or hydrides of nitrogen, such as ammonia), which then escape from, and impart an undesirable amine odor to, the finished foam product. These amine by-products can be detected by a GC/MS analysis.

Foams according to the invention can be obtained by spraying, molding, and continuous pouring (e.g., in a laminator), using known equipment and methods.

One aspect of the invention relates to a composition comprising at least one bismuth carboxylate salt and at least one member selected from the group consisting of alkali metal carboxylate salts and quaternary ammonium carboxylate salts.

One aspect of the invention relates to the foregoing composition wherein the bismuth carboxylate salt has a structure:

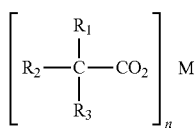

wherein $R_1$, $R_2$, $R_3$ are independently H, $C_1$-$C_{20}$ alkyl or alkenyl group or phenyl group or substituted phenyl group, and M is Bismuth, and n is 3.

Another aspect of the invention relates to any of the foregoing compositions wherein the bismuth carboxylate salt comprises at least one member selected from the group consisting of bismuth neodecanoate, bismuth octoate, bismuth versalate, bismuth naphthenate, bismuth pivalate, bismuth acetate, bismuth subcarbonate, and bismuth citrate.

One aspect of the invention relates to any of the foregoing compositions wherein the alkali metal carboxylate salts and the quaternary ammonium carboxylate salts has a structure:

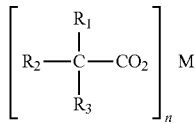

wherein
$R_1$, $R_2$ and $R_3$ are H, $C_1$-$C_{20}$ alkyl or alkenyl group or phenyl group or substituted phenyl group, and M is a metal ion derived from an alkali metal, or M is a tetraalkylammonium ion with the structure $NR_4R_5R_6R_7$, wherein $R_4$ and $R_5$ and $R_6$ and $R_7$ are $C_1$-$C_{18}$ alkyl, alkenyl, or phenyl or substituted phenyl or alkylphenyl, or
$R_4$ and $R_5$ and $R_6$ are $C_1$-$C_{18}$ alkyl or alkenyl groups or phenyl or substituted phenyl or alkylphenyl and $R_7$ is 2-hydroxyalkyl of the type —$CH_2$—$CH(OH)$—$CH_3$, and n is 1.

In another aspect of the invention relates to any of the foregoing compositions wherein the alkali metal carboxylate salt comprises at least one member selected from the group consisting of potassium acetate, potassium octoate, potassium acrylate, potassium pivalate, potassium neooctanoate, and mixtures thereof.

In another aspect of the invention relates to any of the foregoing compositions wherein the quaternary ammonium carboxylate salt comprises at least one member selected from the group consisting of tetramethylammonium pivalate, 2-hydroxylpropyltrimethylammonium pivalate, 2-hydroxylpropyltriethylammonium pivalate, tetraethylammonium pivalate, tetrapropylammonium pivalate, tetrabutylammonium pivalate, potassium triethylacetate, tetramethylammonium triethylacetate, 2-hydroxylpropyltrimethylammonium triethylacetate, 2-hydroxylpropyltriethylammonium triethylacetate, tetraethylammonium triethylacetate, tetrapropylammonium triethylacetate, tetrabutylammonium triethylacetate, potassium neoheptanoate, tetramethylammonium neoheptanoate, 2-hydroxylpropyltrimethylammonium neoheptanoate, 2-hydroxylpropyltriethylammonium neoheptanoate, tetraethylammonium neoheptanoate, tetrapropylammonium neoheptanoate, tetrabutylammonium neoheptanoate, tetramethylammonium neooctanoate, 2-hydroxylpropyltrimethylammonium neooctanoate, 2-hydroxylpropyltriethylammonium neooctanoate, tetraethylammonium neooctanoate, tetrapropylammonium neooctanoate, tetrabutylammonium neooctanoate, and mixtures thereof.

Another aspect of the invention relates to any of the foregoing compositions wherein the composition is substantially free of tin compounds.

In one aspect, the invention relates to a method for making foam comprising contacting at least one polyol, at least one isocyanate and at least one blowing agent in the presence of any of the foregoing compositions.

Another aspect of the invention relates to a method wherein the polyol comprises at least one polyester polyol.

A further aspect of the invention relates to a method for producing a polyisocyanurate foam by contacting at least one isocyanate with at least one polyol in the presence of at least one amine catalyst, at least one blowing agent, and at least one carboxylate catalyst comprising at least one bismuthcarboxylate and at least one of ammoniumcarboxylates and potassiumcarboxylate salts.

In another aspect of the invention, the isocyanate comprises at least one member selected from the group consisting of hexamethylene diisocyanate, isophorone diisocyanate, phenylene diisocyanate, toluene diisocyanate ("TDI"), and 4,4'-diphenyl methane diisocyanate ("MDI").

Another aspect of the invention relates to a foam obtained from any of the foregoing compositions or methods.

In one aspect the foregoing foam has an R-value of about 7 to about 7.5.

In another aspect of the invention, any of the foregoing foam has a cell size of about 50 to about 500 microns.

The aspects of this invention disclosed herein can be used alone or in combination with each other.

DETAILED DESCRIPTION OF THE INVENTION

The catalyst composition of the invention comprises at least one bismuth carboxylate salt in combination with at least one alkali metal based, or at least one bismuth carboxylate salt in combination with at least one quaternary ammonium based carboxylate salts. The molar ratio of bismuth carboxylate salts to alkali metal or quaternary ammonium based carboxylate salt is about 1 mole bismuth for about every 1 to 100 moles alkali or ammonium carboxylate, and in some cases is about 1 mole bismuth for about every 15 to 70 moles alkali metal or quaternary ammonium carboxylate, and in some cases is about 1 mole bismuth to every 25 to 50 moles alkali metal or quaternary ammonium carboxylate. A bismuth carboxylate catalyst composition that is 20% by weight bismuth metal can be used at about 0.10% to about 0.50% by weight of the total resin, about 0.15% to about 0.35% and, in some cases, about 0.20% to about 0.30% by weight of the total resin. An alkali carboxylate catalyst that is about 15% by weight potassium can be used at about 1.0 to about 5.0% by weight of the resin, about 2.0% to about 4.5% and, in some cases, about 2.25% to about 3.0% by weight of the total resin. By "weight of the resin", it is meant a pre-blend or pre-mix of resin comprising all of the foam components, except for the polyisocyanate, and is typically referred to as the "B" (e.g., the B side is contacted with an A side comprising the polyisocyanate in order to produce foam).

The bismuth carboxylate salt has the structure:

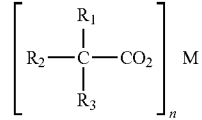

wherein
$R_1$, $R_2$, $R_3$ is defined as below, and M is Bismuth, and n is 3.

Illustrative examples of bismuth carboxylate salts comprise at least one member selected from the group consisting of bismuth neodecanoate, bismuth octoate, bismuth versalate, bismuth naphthenate bismuth pivalate. bismuth acetate, bismuth carbonate, and bismuth citrate.

The alkali metal-based or quaternary ammonium-based carboxylate salts have a structure:

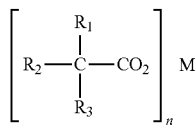

wherein
$R_1$, $R_2$ and $R_3$ are H, $C_1$-$C_{20}$ alkyl or alkenyl group or phenyl group or substituted phenyl group, and M is a metal ion derived from an alkali metal, or M is a tetraalkylammonium ion with the structure $NR_4R_5R_6R_7$, wherein $R_4$ and $R_5$ and $R_6$ and $R_7$ are $C_1$-$C_{18}$ alkyl, alkenyl, or phenyl or substituted phenyl or alkylphenyl, or $R_4$ and $R_5$ and $R_6$ are $C_1$-$C_{18}$ alkyl or alkenyl groups or phenyl or substituted phenyl or alkylphenyl and $R_7$ is 2-hydroxyalkyl of the type —$CH_2$—$CH(OH)$—$CH_3$, and n is 1.

In some aspects of the invention, the metal or ammonium carboxylate structures comprise at least one of:

$R_1$=$CH_3$ or $C_2H_5$ or $C_3H_7$ or $C_4H_3$,
$R_2$=$CH_3$ or $C_2H_5$ or $C_3H_7$ or $C_4H_9$,
$R_3$=$CH_3$ or $C_2H_5$ or $C_3H_7$ or $C_4H_9$; and,
$R_4$ and $R_5$ and $R_6$ and $R_7$=$CH_3$ or $C_2H_5$ or $C_3H_7$ or $C_4H_9$.

Illustrative examples of alkali metal carboxylate and ammonium carboxylate structures can comprise at least one member selected from the group consisting of potassium pivalate, tetramethylammonium pivalate, potassium octoate, potassium acetate, potassium acrylate 2-hydroxylpropylt- rimethylammonium pivalate, 2-hydroxylpropyltriethylammonium pivalate, tetraethylammonium pivalate, tetrapropylammonium pivalate, tetrabutylammonium pivalate, potassium triethylacetate, tetramethylammonium triethylacetate, 2-hydroxylpropyltrimethylammonium triethylacetate, 2-hydroxylpropyltriethylammonium triethylacetate, tetraethylammonium triethylacetate, tetrapropylammonium triethylacetate, tetrabutylammonium triethylacetate, potassium neoheptanoate, tetramethylammonium neoheptanoate, 2-hydroxylpropyltrimethylammonium neoheptanoate, 2-hydroxylpropyltriethylammonium neoheptanoate, tetraethylammonium neoheptanoate, tetrapropylammonium neoheptanoate, tetrabutylammonium neoheptanoate, potassium neooctanoate, tetramethylammonium neooctanoate, 2-hydroxylpropyltrimethylammonium neooctanoate, 2-hydroxylpropyltriethylammonium neooctanoate, tetraethylammonium neooctanoate, tetrapropylammonium neooctanoate, tetrabutylammonium neooctanoate, and mixtures thereof.

The components of the catalyst composition can be combined with one or more materials such as those listed in the table below. The Product Names in the table below are used in this Description and the Examples. The components of the catalyst composition can be combined in conventional equipment and by any suitable method such as metering the appropriate masses into some appropriate mixing/holding vessel, and agitating using any of several mechanical means until a homogeneous mixture is achieved.

| Product Name | Product Description |
| --- | --- |
| Dabco ® K-15 | A trimer catalyst commercially available from Air Products, Inc. comprising potassium octoate, 15% by weight potassium. |
| Polycat ® 46 | A trimer catalyst commercially available from Air Products, Inc. comprising potassium acetate, 18% by weight potassium. |
| Catalyst A | A trimer catalyst comprising potassium pivalate, 14% by weight potassium, manufactured in accordance with US Patent Publication Nos 2007/0,259,773; 2007/0,259,982; and 2007/0,259,983; the disclosure of which are hereby incorporated by reference. |
| Catalyst B | A trimer catalyst, comprising of tetramethyl ammonium pivalate, 50% active, manufactured in accordance with US Patent Publication Nos 2007/0,259,773; 2007/0,259,982; and 2007/0,259,983; the disclosure of which are hereby incorporated by reference. |
| Catalyst C | A metal catalyst comprising bismuth pivalate, 16% wt bismuth, prepared by the reaction of bismuth trioxide with neopentanoic acid, according to the method described in U.S. Pat. No. 4,584,362 which is hereby incorporated by reference. |
| Catalyst D | A metal catalyst comprising bismuth neodecanoate, 20% by weight bismuth, prepared according to the method described in U.S. Pat. No. 6,825,238 which is hereby incorporated by reference. |
| Catalyst E | A metal catalyst comprising bismuth octoate, 27% by weight bismuth, prepared according to the method described in U.S. Pat. No. 6,825,238 which is hereby incorporated by reference, |
| Catalyst F | A metal catalyst comprising bismuth octoate, 10% by weight bismuth, prepared according to the method described in U.S. Pat. No. 6,825,238 which is hereby incorporated by reference, |
| Polycat ® 5 | A tertiary amine catalyst, commercially available from Air Products, Inc. |
| Polycat ® 36 | A tertiary amine catalyst, commercially available from Air Products, Inc. |
| Dabco ® DC5585 | A silicon polyether surfactant, commercially available from Air Products, Inc. |

One aspect of the invention relates to a method for making foam. A process according to the invention can be carried out by using conventional equipment for making foams (e.g., rigid foams, molded foams, laminated foams and spray foams). A catalytically effective amount of the catalyst composition of the invention is used in a polyurethane/polyisocyanurate formulation comprising at least one polyisocyanate, at least one polyether or polyester polyol, water or other suitable blowing agents, and cell stabilizers such as silicon surfactants. Examples of suitable polyisocyanates comprise at least one member selected from the group consisting of hexamethylene diisocyanate, isophorone diisocyanate, phenylene diisocyanate, toluene diisocyanate ("TDI"), and 4,4'-diphenyl methane diisocyanate ("MDI"). Especially suitable are 2,4- and 2,6-toluene diisocyanate individually or together as their commercially available mixtures. Other suitable mixtures of diisocyanates are those known commercially as "polymeric MDI", which contains about 60% of 4,4'-diphenylmethane diisocyanate along with other isomeric and analogous higher polyisocyanates. Also suitable are "prepolymers" of these polyisocyanates comprising a partially pre-reacted mixture of polyisocyanates and polyether and polyester polyol. The amount of polyisocyanate typically ranges from about 100% to about 200% by weight of the resin, about 115% to about 170% by weight of the resin and in some cases about 120% to about 150% by weight of the resin.

Suitable polyols comprise those polyols typically used in the art for making, for example, rigid PIR foam including the polyalkylene ether and polyester polyols. The polyalkylene ether polyol include the poly(alkyleneoxide) polymer such as poly(ethyleneoxide) and poly(propyleneoxide) polymers and copolymers with terminal hydroxyl groups derived from polyhydric compounds including diols and triols for example, among others, at least one member selected from the group consisting of ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, sugars such as sucrose and like low molecular weight polyols. Also, useful are amine polyether polyols which can be prepared when an amine, such as ethylenediamine, diethylenetriamine, tolylenediamine, diphenylmethanediamine, triethanolamine or the like is reacted with ethylene oxide or propylene oxide. The amount of polyol can range from about 65% to about 85% by weight of the resin, about 70% to about 80% by weight of the resin and in some cases about 72% to about 75% by weight of the resin.

In one aspect of the invention, a single high molecular weight polyether polyol may be used. Also, mixtures of high molecular weight polyether polyols such as mixtures of different multifunctional materials and/or different molecular weight or different chemical composition materials may be used.

Useful polyester polyol include those produced when a dicarboxylic acid is reacted with an excess of a diol for example adipic acid or phathalic acid or phthalic anhydride with ethylene glycol or butanediol or reacting a lactone with an excess of a diol such as caprolactone with propylene glycol.

Blowing agents that can be employed in the instant composition can comprise at least one member selected from the group consisting of water, methylene chloride, acetone, chlorofluorocarbons (CFCs), hydrocholorofuorocarbons (HCFCs) such as HCFC-141b (commercially available as Genetron® 141b), HCFC-22, HCFC-123, hydrofluorocarbons such as HFC-245fa (commercially available as Enovate® 3000), HFC-134a (commercially available as Formacel® Z-4), HFC-365mfc (commercially available as Solkane® 365mfc), hydrocarbons such as n-pentane, isopentane, cyclopentane and their mixtures, hydrofluroolefins (HFO's) such as FEA-1100 (Formacel® 1100), hydrochlorfluroolefins (HFCO's) such as HFCO-1233zd (Solstice® LBA), and HFCO-1234ze (Solstice® GBA). In one aspect of the invention, the blowing agent comprises at least one member selected from the group consisting of water, hydrofluorocarbon, carbon dioxide, hydrohaloolefin and hydrocarbon. The amount of blowing agent typically ranges from about 5% to about 25% by weight of the resin, about 8% to about 18%-by weight of the resin and in some cases about 10% to about 15% by weight of the resin.

If desired, the instant composition can comprise at least one cell stabilizer such as organopolysiloxane surfactants; flame retardants such as halogenated organophosphorous compounds; and chain extenders such as ethylene glycol and butane diol. The amount of the foregoing typically ranges from about 0.5% to about 10% by weight of the resin, about 1.0% to about 8% by weight of the resin- and in some cases about 1.5% to about 7% by weight of the resin In one aspect of the invention, the catalyst composition, pre-mix and foam are substantially free of tin compounds including organic tin compounds. By "substantially free" it is meant that the foregoing contain less than about 5% by weight of the resin, normally less than about 3% by weight of the resin and in some cases 0% by weight of the resin tin compounds.

In another aspect of the invention, the catalyst composition is combined with at least one diluent. Examples of suitable diluents comprise at least one member selected from the group consisting of ethylene glycol, propylene glycol, di-ethylene glycol, dipropylene glycol, as well as polyethylene or poly-propylene glycols in the 100-1000 molecular weight range. The amount of diluent can range from about 70% to about 20% by weight of the catalyst combination, about 50% to about 25% by weight of the catalyst combination and in some cases about 35% to about 25% by weight of the catalyst combination.

If desired, a pre-blend or pre-mix or resin comprising all or some of the foam components, except for the polyisocyanate can be prepared by using conventional equipment and methods by metering the appropriate masses into an appropriate mixing/holding vessel, and agitating using any of several mechanical means until a homogeneous mixture is achieved. The pre-mix is then contacted with any remaining ingredients and the polyisocyanate in order to produce a foam.

Foams obtained by the instant invention can be used for a wide range of applications including appliance insulation (e.g., insulating refrigerators or water heaters), structural insulation (e.g. spray foams or lamination foams for commercial or residential insulation), among other known uses. The isocyanate index can be tailored for the intended foam usage and is determined by stoichiometric calculation. This can be described as the amount of isocyanate required to react with the polyol and any other reactive additives, as described in Polyurethane Foam Basic Chemistry and Polyurethane Foam Polymerization Reaction, (as published in "Flexible Polyurethane Foams" by Dow Chemical Co.) in terms of stoichiometric equivalents. The isocyanate index can range from about 100 to about 400, about 120 to about 300 and in some cases about 150 to about 250.

While any suitable foam formulation can be employed, one example of a foam formulation, including the relative amount of different components, is shown in Table 1.

TABLE 1

| COMPONENT | % by Weight of the Resin Blend |
|---|---|
| Polyurethane Polyol | 65-85 |
| Fire retardant | 0-10 |
| Surfactant | 1-3 |
| Water | 0-5 |

TABLE 1-continued

| COMPONENT | % by Weight of the Resin Blend |
|---|---|
| Blowing agent | 0-25 |
| Amine catalysts | 0.1-7 |
| Carboxylate salt catalysts | 0-4 |

The foregoing components of the resin are contacted with an amount of polymeric MDI in order to provide an NCO index of 100-400.

Cell size refers to the diameter of the bubbles that make up the internal structure of the cured PUR/PIR foam sample. Cell size can be measured by using scanning electron microscopy. Samples are prepared using a fresh single-edge razor blade for each sample. A thin piece was mounted on conductive carbon double-stick tape, and then 5 nm of gold/palladium was sputter coated (Anatech Hummer V) onto the samples to make them conductive for imaging. Imaging was performed at 5 kV accelerating voltage at a magnification of ×100 using a JEOL 5910LV scanning electron microscope. The images were imported into AnalySIS image analysis software and measurements of the cell diameters were made in the longest dimension. Twenty-five cells per image were analyzed. The data was placed in an Excel spreadsheet, and then statistical analysis was performed to obtain mean and minimum cell diameter measurements for each sample. Foams produced by the instant method can have a cell diameter ranging from about 50 microns to about 500 microns, about 70 to about 250 microns and in some cases about 90 to about 150 microns.

Mechanical mixing of the isocyanate and resin components during the foam making process produces a certain number of cells at the initial stages of the foam reaction. Cell coalescence refers to an agglomeration of small (fine) cells to form large (coarse) cells, reducing the overall number of cells in a foaming mixture. Once the chemical reaction has progressed to a certain point, the viscosity of the foaming mixture becomes high enough that cell coalescence can no longer occur.

R-value can be used to characterize a material's insulating performance numerically. R-value measures resistance to thermal conductivity thereby indicating insulating performance. R-value is reported in ($ft^2 \cdot °F \cdot hr/Btu$). Higher R-values signify higher insulation performance. R-value can be measured with a LaserComp heat flow meter according to ASTM C518. Foams produced by the instant method typically have an R-value of about 6 to about 6.9, about 6.5 to about 7.5 and in some cases about 7 to about 7.5. A significant change in R-value would be a positive or negative change of 5% or more.

Without wishing to be bound by any theory or explanation, it is believed that cell coalescence correlates to polymerization speed or the length of time required for the foam to "cure"; the length of time for complete polymerization. The more slowly polymerization progresses, the more extensive cell coalescence becomes. It is also believed that coalescence has a negative effect on insulating performance. In particular, foam coalescence can lead to larger cells and larger cells can lead to lower R-value. As a result, coalescence, cell size and R-value can be correlated, in that, as coalescence progresses, cell size increases, and R-value decreases and, if coalescence is inhibited, cell size decreases, and R-value increases.

The instant invention can produce foams such as PIR/PUR foams with faster reaction rates (faster polymerization), and elapsed polymerization times approximately half that of standard formulations (e.g., Example 1 below). These faster reaction rates can restrict or retard cell coalescence thereby leading to smaller foam cell sizes as discussed above. The smaller cell sizes in turn lead to higher R-values and better insulation properties.

The following Examples are provided to illustrate certain aspects of the invention and shall not limit the scope of the appended claims.

EXAMPLES

Example 1: Evaluation of the Control Catalyst in a PIR Formulation

The evaluation of the catalyst reactivity in a PIR system was conducted using free-rise cup foam samples with a FOMAT sonar Rate-Of-Rise device (hereafter referred to as a "ROR"). The FOMAT device comprises a sonar sensor that measures and records the height in millimeters (mm) of the rising foam sample versus time in seconds (s), directly after mixing all components of the formulation. The FOMAT standard software generates both height versus time plots and velocity versus time plots. These plots are useful for comparing the relative reactivity of different catalyst formulations. One suitable formulation for making PIR foam samples for ROR measurement by the FOMAT, including the relative amount of different components, is described below in Table 2.

TABLE 2

| COMPONENT (mass percent in resin) | CONTROL (Example 1) |
|---|---|
| Polyester Polyol | 70-75 |
| Tri-chloro-propylphosphate | 7-10 |
| Dabco ® DC5585 | 1.5-2.0 |
| Water | 0.0-0.50 |
| n-Pentane | 15-20 |
| Polycat ® 36 | 0.15-0.30 |
| Dabco ® K-15 | 2-5 |
| Polycat ® 46 | 0-1.0 |

The control experiment utilizes 2.25% by weight Dabco® K15 and 0.50% by weight Polycat® 46 in the total resin blend, and is hereafter referred to as the "Control." The percent amount of each catalyst is given in weight percent of the total resin blend including the polyol, fire retardant, surfactant, water, amine catalyst, metal catalysts, and blowing agent. For all examples, the ratio of polyol, fire retardant, surfactant, water, amine catalyst, blowing agent, and isocyanate are kept constant, and only the metal or ammonium carboxylate catalysts are varied.

The polyester polyol, trichloropropylphosphate fire retardant, Dabco® DC5585 surfactant, water, and n-Pentane blowing agent were combined in a Nalgene container and agitated by shaking by hand until the mixture was well-blended to make a polyol pre-blend. The Polycat® 36 amine catalyst and Dabco® K15 and Polycat® 46 trimer catalysts were combined in a separate Nalgene container and agitated with a tongue depressor until well-blended to make a catalyst pre-blend.

To make a foam sample for ROR reactivity measurements, 97 grams of the polyol pre-blend and the 123 grams of polymeric MDI were combined in a 64 oz paper cup and mixed for 10 sec at 3,000 RPM using an overhead stirrer fitted with a 4 in (10 cm) diameter stirring paddle. Then, 3.0 grams of the catalyst pre-blend were added to the cup, and the entire composition mixed again for 4 sec at 3,000 RPM using the same mixer and paddle. The cup is then placed under the FOMAT sensor. The start time for ROR measurement is automated for the FOMAT and begins directly after the end of the final mixing.

Once the cup is placed under the ROR, the chemical mixture begins to polymerize. Since the walls of the cup restrict the expansion in all but the vertical direction, this expansion manifests itself in this experiment as an increase in height with passing time. This increase in height can also be displayed as a rate of changing height (a velocity) versus time. Useful comparisons can be made on the rate of the foaming reaction by recording the time required after mixing for the foam to reach standard heights of 50 mm and 300 mm, as well as the maximum foam rise velocity recorded and the time after mixing that was required to achieve the maximum velocity. In Example 1 (Control), the foam reached a height of 50 mm approximately 12 seconds after mixing, a height of 300 mm approximately 24 seconds after mixing, and a maximum foam rise velocity of 37 mm/sec approximately 15 seconds after mixing, as shown in Table 3.

In addition to free-rise cup reactivity measurements with the FOMAT equipment, foam panels were prepared in an aluminum mold to generate samples suitable for measuring R-value and cell size. The mold used for these studies measured 70×35×7 cm, and was heated to a surface temperature of 60° C. In a typical preparation of a molded foam sample, 291 grams of the polyol pre-blend (prepared as described above) and the 369 grams of polymeric MDI were combined in a 64 oz paper cup and mixed for 10 sec at 3,000 RPM using an overhead stirrer fitted with a 4 in (10 cm) diameter stirring paddle. Then, 9.0 grams of the catalyst pre-blend (prepared as described above) were added to the cup, and the entire composition mixed again for 4 sec at 3,000 RPM using the same mixer and paddle. The contents of the cup were then quickly poured into the open mold, and the mold lid was immediately closed and fastened. The demold time, or the time the foaming sample stayed in the closed mold, was 5 minutes. Foam samples were allowed to age at room temperature outside of the mold for 24 hours before being cut for R-value or cell size measurements. R-value and cell size were measured as described above, and are shown in Table 3 below.

Example 2: Evaluation of the Inventive Catalyst Combination of a Bismuth Carboxylate and a Potassium Carboxylate A foam was prepared according to the procedure described in Example 1 such that the total resin blend contained 0.25% by weight Catalyst D, 2.25% by weight Dabco® K15, and 0.5% by weight Polycat® 46. The ratio of moles bismuth to moles potassium utilized in this example is 1 mole bismuth to about 40 moles potassium. The cell sizes and R-value were measured from molded parts in accordance with Example 1 and are given in Table 3.

The foam produced from the Control formulation reaches a height of 50 mm approximately 12 seconds after mixing, and reaches a height of 300 mm approximately 24 seconds after mixing. In contrast, the foam produced from Example 2 with the inventive catalyst combination reaches a height of 50 mm approximately 7 seconds after mixing and a height of 300 mm about 14 seconds after mixing. This represents a significant reduction in the time required for the foaming reaction to occur in Example 2 versus Example 1.

The foam rise velocity reaches a maximum of 37 mm/s for the Control formulation about 15 seconds after mixing. In contrast, the foam rise velocity for the formulation of Example 2 reaches a maximum velocity of 60 mm/s about 8 seconds after mixing. Both the increase in maximum velocity and decrease in the time required to obtain the maximum velocity, illustrate the significant acceleration in the reaction profile obtained when combining a potassium trimer catalyst with a bismuth carboxylate catalyst. As also shown in Table 3, this combination of catalysts also resulted in smaller cell sizes in the PIR foam (a 21% reduction in the mean cell size versus the control Example 1), and a higher R-value (a 6.5% increase in the R-value versus Example 1). Without wishing to be bound by theory, it is believed that the smaller cell size is a result of the accelerated reaction profile in the formulation of Example 2 leading to less cell coalescence during the initial stages of the reaction.

TABLE 3

| Example | Weight percent catalyst in the total resin blend | ROR Time to 50, 300 mm (sec) | ROR Maximum Velocity (mm/sec) | ROR Time to Maximum Velocity (sec) | Mean, Min Cell Diameter (μm) | R-Value per inch |
|---|---|---|---|---|---|---|
| 1 | 2.25% Dabco ® K-15 + 0.50% Polycat ® 46 | 12, 24 | 37 | 15 | 194, 93 | 6.50 |
| 2 | 2.25% Dabco ® K15 + 0.50% Polycat ® 46 + 0.25% Catalyst D | 7, 14 | 60 | 8 | 152, 56 | 6.92 |

Example 3: Further Evaluation of the Inventive Catalyst Combination of a Bismuth Carboxylate and a Potassium Carboxylate A first set of foams were prepared according to the procedure described in Example 1 such that the total resin blend contained either 2.75% wt Dabco® K15 (Example 3a), 2.75% wt Catalyst A (Example 3b), or 3.30% wt Polycat® 46 (Example 3c). A second set of foams were prepared by the same procedure, and further comprised 0.25% wt Catalyst D in the total resin blend for each (Examples 3d, 3e, 3f). The weight percent of catalysts for each foam is shown in Table 4. For all three formulations that contained Catalyst D, the molar ratio of bismuth to potassium was approximately 40 moles potassium to every 1 mole bismuth. The time after mixing for the foams to reach 50 mm and 300 mm in height, the maximum foam rise velocity, and the time after mixing it took to reach the maximum velocity, are shown in Table 4. The R-values were measured from molded parts in accordance with Example 1 and are also given in Table 4.

As shown in Table 4, the addition of the bismuth carboxylate catalyst made a significant impact on the reactivity for all three systems. In each case, the time required after mixing the formulation for the foam to reach a height of either 50 mm or 300 mm decreased by at least 30%, and in some cases as much as 50%, the maximum velocity of the foam rising as measured by the ROR instrument increases by about 40%, and the time it took the reaction to progress to the maximum velocity decreased by at about 50%. Subsequently, the R-value of the foam samples prepared with the combination of the potassium carboxylate and bismuth carboxylate catalysts increased by about 6% to 10%, representing a significant improvement of the insulation properties for the foams produced using the combination of a potassium carboxylate catalyst and a bismuth carboxylate catalyst.

TABLE 4

| Example | Weight percent catalyst in the total resin blend | ROR Time to 50, 300 mm (sec) | ROR Maximum Velocity (mm/sec) | ROR Time to Maximum Velocity (sec) | R-Value per inch |
|---|---|---|---|---|---|
| 3a | 2.75% Dabco ® K-15 | 14, 28 | 30 | 18 | 6.00 |
| 3d | 2.75% Dabco ® K-15 + 0.25% Catalyst D | 8, 19 | 47 | 9 | 6.60 |
| 3b | 2.75% Catalyst A | 15, 23 | 40 | 20 | 6.44 |
| 3e | 2.75% Catalyst A + 0.25% Catalyst D | 6, 11 | 56 | 7 | 7.03 |
| 3c | 2.75% Polycat ® 46 | 14, 25 | 34 | 20 | 6.14 |
| 3f | 2.75% Polycat ® 46 + 0.25% Catalyst D | 7, 14 | 48 | 9 | 6.51 |

Example 4: Demonstration of Synergistic (not Additive) Effect of Bismuth Carboxylate/Potassium Carboxylate Catalyst Combination Two foam samples were prepared according to the procedure described in Example 1 such that the total resin blend contained either 6.13% Catalyst A (Example 4a) or 0.25% Catalyst D (Example 4b). The foam of Example 4b was not stable due to insufficient polymerization and collapsed. The, reactivity data are summarized in Table 5. The cell diameter and R-values were measured from molded parts in accordance with Example 1 and are given in Table 5. This data is compared to that obtained for the samples of Example 3b with either 2.75% of Catalyst A, or Example 3e with the combination of 2.75% Catalyst A and 0.25% Catalyst D in the total resin blend.

TABLE 5

| Example | Weight percent catalyst in the total resin blend | ROR Time to 50, 300 mm (sec) | ROR Maximum Velocity (mm/sec) | ROR Time to Maximum Velocity (sec) | Mean, Min Cell Diameter (μm) | R-Value per inch |
|---|---|---|---|---|---|---|
| 3b | 2.75% Catalyst A | 15, 23 | 40 | 20 | 172, 89 | 6.44 |
| 4a | 6.13% Catalyst A | 8, 12 | 80 | 10 | 175, 70 | 6.54 |
| 4b | 0.25% Catalyst D | foam collapse, insufficient reaction | | | | |
| 3e | 2.75% Catalyst A + 0.25% Catalyst D | 6, 11 | 56 | 7 | 154, 59 | 7.03 |

The foam prepared using 6.13% Catalyst A in the total resin blend, or over twice as much potassium carboxylate catalyst as the control, exhibited an increased reactivity profile with about a 50% reduction in the time it took the foam to rise to a height of 300 mm after mixing, the maximum foam rise velocity was increased by 100%, and the time it took to achieve the maximum rise velocity decreased by 50%. This is similar to the acceleration observed for the foam prepared with 2.75% Catalyst A in combination with 0.25% Catalyst D. However, the R-value for the foam prepared with 6.13% Catalyst A was only 1.6% higher than the R-Value of the foam prepared in Example 3b (with no bismuth co-catalyst), and does not represent a significant improvement in R-value. Furthermore, the mean cell diameter of the sample prepared with 6.13% Catalyst A was not significantly reduced compared to the sample prepared with 2.75% Catalyst A, in the absence of the bismuth catalyst Catalyst D.

The Catalyst D was an inefficient catalyst when used in the absence of a potassium carboxylate salt co-catalyst, resulting in foam collapse. This example illustrates the synergy obtained when using a combination of a potassium carboxylate catalyst and a bismuth carboxylate catalyst to provide a PIR foam with a small foam cell diameter and an improved R-value.

Example 5: Variation of the Potassium/Bismuth Ratio

Two foam samples were prepared according to the procedure described in Example 1 such that the total resin blend contained either a combination of 1.12% Dabco® K15, 0.50% Polycat® 46, and 0.25% Catalyst D (Example 5a), or a combination of 0.56% Dabco® K15, 0.50% Polycat® 46, and 0.25% Catalyst D (Example 5b) in the total resin blend. These samples were compared to either a combination of 2.25% Dabco® K15 and 0.5% Polycat® 46 (Example 1), or a combination of 2.25% Dabco® K15, 0.50% Polycat® 46 and 0.25% Catalyst D (Example 2) in the total resin blend. The reactivity data from the ROR profiles, and approximate molar ratio of Potassium to Bismuth metal, are summarized in Table 6.

As demonstrated in previous examples, adding the Catalyst D bismuth catalyst at a ratio of about 40 moles potassium to 1 mole bismuth results in a significant reduction in the time after mixing required for the foam to reach a height of 50 mm. This example shows that even when the amount of potassium carboxylate catalyst is reduced by up to 60% compared to the control, the time required to reach the foam height of 50 mm still remains very low. This data suggests the synergy between the bismuth carboxylate catalyst and the potassium carboxylate catalyst has the greatest effect on the initial stages of the polymerization reaction. The approximate molar ratios of Potassium-to-Bismuth (K/Bi) in Examples 2, 5a, and 5b are 40/1, 25/1, and 15/1, respectively, and there is no bismuth catalyst in Example 1.

TABLE 6

| Example # | Weight percent catalyst in the total resin blend | ROR Time to 50, 300 mm (sec) | ROR Maximum Velocity (mm/sec) | ROR Time to Maximum Velocity (sec) | Molar ratio of K/Bi |
|---|---|---|---|---|---|
| 1 | 2.25% Dabco ® K-15 + 0.50% Polycat ® 46 | 12, 24 | 37 | 15 | No Bi used |
| 2 | 2.25% Dabco ® K15 + 0.50% Polycat ® 46 + 0.25% Catalyst D | 7, 14 | 60 | 8 | ~40/1 |
| 5a | 1.12% Dabco ® K15 + 0.50% Polycat ® 46 + 0.25% Catalyst D | 7, 22 | 36 | 10 | ~25/1 |

TABLE 6-continued

| Example # | Weight percent catalyst in the total resin blend | ROR Time to 50, 300 mm (sec) | ROR Maximum Velocity (mm/sec) | ROR Time to Maximum Velocity (sec) | Molar ratio of K/Bi |
|---|---|---|---|---|---|
| 5b | 0.56% Dabco ® K15 + 0.50% Polycat ® 46 + 0.25% Catalyst D | 8, 34 | 25 | 12 | ~15/1 |

Example 6: Demonstration of Synergistic Effect of the Ammonium Carboxylate Salt/Bismuth Carboxylate Catalyst Combination Two foam samples were prepared according to the procedure described in Example 1 such that the total resin blend contained either a combination of 2.75% of the ammonium carboxylate salt Catalyst B in the total resin blend (Example 6a), or a combination of 2.75% Catalyst B and 0.25% Catalyst D in the total resin blend (Example 6b), such that the molar ratio of ammonium-to-Bismuth was approximately 35/1 for Example 6b. The reactivity data from the ROR profiles is summarized in Table 7. R-values were measured from molded parts in accordance with Example 1, and are shown in Table 7.

The effect of using the ammonium carboxylate trimer Catalyst B in combination with the bismuth carboxylate catalyst was more than a 50% reduction in the time required after mixing for the foam to reach heights 50 mm and 300 mm, a 50% increase in the maximum foam rise velocity, a 60% decrease in the time required to reach the maximum velocity, and a 15% increase in the R-value. This improvement in R-value is significant and consistent with a synergistic effect of the combination of an ammonium carboxylate catalyst and a bismuth carboxylate catalyst for a PUR/PIR formulation.

TABLE 7

| Example | Weight percent catalyst in the total resin blend | ROR Time to 50, 300 mm (sec) | ROR Maximum Velocity (mm/sec) | ROR Time to Maximum Velocity (sec) | R-Value per inch |
|---|---|---|---|---|---|
| 6a | 2.75% Catalyst B | 21, 31 | 30 | 26 | 5.85 |
| 6b | 2.75% Catalyst B + 0.25% Catalyst D | 7, 14 | 45 | 10 | 6.85 |

Example 7: Demonstration of the Synergistic Effect with Alternate Bismuth Carboxylates A foam sample was prepared according to the procedure described in Example 1 such that the total resin blend contained the combination of 2.75% of the potassium carboxylate Catalyst A and 0.32% of the bismuth pivalate based Catalyst C, such that the molar ratio of Potassium-to-Bismuth was approximately 40/1. The reactivity data from the ROR profiles is summarized in Table 8.

TABLE 8

| Example | Weight percent catalyst in the total resin blend | ROR Time to 50, 300 mm (sec) | ROR Maximum Velocity (mm/sec) | ROR Time to Maximum Velocity (sec) |
|---|---|---|---|---|
| 3b | 2.75% Catalyst A | 15, 23 | 40 | 20 |
| 3e | 2.75% Catalyst A + 0.25% Catalyst D | 8, 12 | 56 | 7 |
| 7 | 2.75% Catalyst A + 0.32% Catalyst C | 7, 15 | 37 | 8 |

The effect of using the potassium carboxylate Catalyst A in combination with the bismuth carboxylate Catalyst C catalyst was more than a 50% reduction in the time required after mixing for the foam to reach heights 50 mm and 300 mm, and a 50% decrease in the time required to reach the maximum foam rise velocity. These results are similar to that observed in Example 3e with the combination Catalyst A and Catalyst D co-catalysts, and illustrates that the synergistic effect extends to bismuth catalysts other than Catalyst D.

Example 8: Further Demonstration of the Synergistic Effect with Alternate Bismuth Carboxylates, as Well as Bismuth Concentration Three foam samples were prepared according to the procedure described in Example 1 such that the total resin blend contained 2.00% Catalyst A and 0.20% of a Bismuth-containing carboxylate salt. For Example 8a, the molar ratio of bismuth to potassium was approximately 40 moles potassium to every 1 mole Bismuth. For Example 8b, the molar ratio of bismuth to potassium was approximately 30 moles potassium to every 1 mole of bismuth. For Example 8c, the molar ratio of bismuth to potassium was approximately 75 moles potassium to every 1 mole of bismuth. The reactivity data is summarized in Table 9.

TABLE 9

| Example | Weight percent catalyst in the total resin blend | ROR Time to 50, 300 mm (sec) | ROR Maximum Velocity (mm/sec) | ROR Time to Maximum Velocity (sec) |
|---|---|---|---|---|
| 8a | 2.00% Catalyst A + 0.20% Catalyst D | 9, 20 | 31 | 12 |
| 8b | 2.00% Catalyst A + 0.20% Catalyst E | 8, 16 | 38 | 9 |
| 8c | 2.00% Catalyst A + 0.20% Catalyst F | 13, 23 | 32 | 17 |

The foam prepared using Catalyst E reacts more quickly than the foam prepared using catalyst D. The foam prepared using Catalyst F reacts more slowly than the foam prepared using catalyst D. Without wishing to be bound by theory, this data suggests that other ligands besides neo-decanoate (e.g., those mentioned in paragraphs 0019 and 0033) can also be used in accordance with this invention, and that higher Bismuth concentration leads to shorter reaction times/faster reactivity, and thus, as has already been demonstrated above, to smaller mean minimum cell diameter and higher R value per inch.

While the invention has been described with reference to certain aspects, it will be understood by those skilled in the art that various changes may be made and equivalents may be substituted for elements thereof without departing from the scope of the invention. The various aspects disclosed herein can be used alone or in singular or multiple combinations with each other. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and combinations thereof falling within the scope of the appended claims.

The invention claimed is:

1. A catalyst composition for making a polyisocyanurate/polyurethane foam comprising at least one bismuth carboxylate salt selected from the group consisting of bismuth neodecanoate, bismuth octoate, bismuth versalate, bismuth naphthenate, bismuth pivalate, bismuth acetate, bismuth subcarbonate, and bismuth citrate and at least one member selected from the group consisting of potassium carboxylate salts and quaternary ammonium carboxylate salts,
wherein a molar ratio of the potassium carboxylate or quaternary ammonium carboxylate to the Bismuth carboxylate is between 44 to 1 and 50 to 1; wherein the use level of potassium carboxylate or quaternary ammonium carboxylate is 2.5-3.5% by weight of the total resin; and wherein the use level of bismuth carboxylate is 0.2-0.3% by weight of the total resin.

2. The composition of claim 1 wherein the quaternary ammonium carboxylate salt and the potassium carboxylate salt comprise at least one member selected from the group consisting of potassium pivalate, tetramethylammonium pivalate, potassium octoate, potassium acetate, potassium acrylate, 2-hydroxylpropyltrimethylammonium pivalate, 2-hydroxylpropyltriethylammonium pivalate, tetraethylammonium pivalate, tetrapropylammonium pivalate, tetrabutylammonium pivalate, potassium triethylacetate, tetramethylammonium triethylacetate, 2-hydroxylpropyltrimethylammonium triethylacetate, 2-hydroxylpropyltriethylammonium triethylacetate, tetraethylammonium triethylacetate, tetrapropylammonium triethylacetate, tetrabutylammonium triethylacetate, potassium neoheptanoate, tetramethylammonium neoheptanoate, 2-hydroxylpropyltrimethylammonium neoheptanoate, 2-hydroxylpropyltriethylammonium neoheptanoate, tetraethylammonium neoheptanoate, tetrapropylammonium neoheptanoate, tetrabutylammonium neoheptanoate, potassium neooctanoate, tetramethylammonium neooctanoate, 2-hydroxylpropyltrimethylammonium neooctanoate, 2-hydroxylpropyltriethylammonium neooctanoate, tetraethylammonium neooctanoate, tetrapropylammonium neooctanoate, tetrabutylammonium neooctanoate, and mixtures thereof.

3. The composition of claim 1 wherein the composition is substantially free of tin compounds.

4. A method for making foam comprising contacting at least one polyol, at least one isocyanate and at least one blowing agent in the presence of the composition of claim 1.

5. The method of claim 4 wherein the polyol comprises at least one polyester polyol.

6. The method of claim 4 wherein the isocyanate comprises at least one member selected from the group consisting of hexamethylene diisocyanate, isophorone diisocyanate, phenylene diisocyanate, toluene diisocyanate ("TDI"), and 4,4'-diphenyl methane diisocyanate ("MDI").

7. The method of claim 4 wherein the method comprises at least one step selected from the group of spraying, molding and laminating.

8. The method of claim 4 wherein the blowing agent comprises at least one member selected from the group consisting of water, hydrofluorocarbon, carbon dioxide, hydrohaloolefin and hydrocarbon.

9. The method of claim 4 further comprising at least one tertiary amine catalyst.

10. A foam obtained by the method of claim 4.

11. The foam of claim 10 wherein the foam has an R-value of about 6.5 to about 7.5.

12. The foam of claim 10 wherein the foam has an average cell diameter of about 50 to about 500 microns.

13. The foam of claim 12, wherein a minimum cell diameter is less than 59 microns.

14. The foam of claim 12 wherein the foam has an average cell diameter of about 50 to about 154 microns.

15. A method for producing a polyisocyanurate foam by contacting at least one isocyanate with at least one polyol in the presence of at least one amine catalyst, at least one blowing agent, and at least one carboxylate catalyst comprising at least one bismuthcarboxylate selected from the group consisting of bismuth neodecanoate, bismuth octoate, bismuth versalate, bismuth naphthenate, bismuth pivalate, bismuth acetate, bismuth subcarbonate, and bismuth citrate and at least one of ammoniumcarboxylate and potassiumcarboxylate salts,
wherein a molar ratio of the potassiumcarboxylate or ammoniumcarboxylate to the bismuthcarboxylate is between 44 to 1 and 50 to 1; wherein the use level of potassium carboxylate is 2.5-3.5% by weight of the total resin; and wherein the use level of bismuth carboxylate is 0.2-0.3% by weight of the total resin.

16. A method for preparing a polyisocyanurate/polyurethane foam which comprises contacting at least one polyisocyanate with a premix comprising at least one polyol, at least one blowing agent, and a catalytic amount of a catalyst composition comprising a solution of at least one member selected from the group of bismuth neodecanoate, bismuth octoate, bismuth versalate, bismuth naphthenate, and bismuth pivalate; and at least one member selected from the group consisting of potassium pivalate, tetramethylammonium pivalate, potassium octoate, potassium acetate, potassium acrylate 2-hydroxylpropyltrimethylammonium pivalate, 2-hydroxylpropyltriethylammonium pivalate, tetraethylammonium pivalate, tetrapropylammonium pivalate, tetrabutylammonium pivalate, potassium triethylacetate, tetramethylammonium triethylacetate, 2-hydroxylpropyltrimethylammonium triethylacetate, 2-hydroxylpropyltriethylammonium triethylacetate, tetraethylammonium triethylacetate, tetrapropylammonium triethylacetate, tetrabutylammonium triethylacetate, potassium neoheptanoate, tetramethylammonium neoheptanoate, 2-hydroxylpropyltrimethylammonium neoheptanoate, 2-hydroxylpropyltriethylammonium neoheptanoate, tetraethylammonium neoheptanoate, tetrapropylammonium neoheptanoate, tetrabutylammonium neoheptanoate, potassium neooctanoate, tetramethylammonium neooctanoate, 2-hydroxylpropyltrimethylammonium neooctanoate, 2-hydroxylpropyltriethylammonium neooctanoate, tetraethylammonium neooctanoate, tetrapropylammonium neooctanoate, and tetrabutylammonium neooctanoate, and wherein a molar ratio of the potassium carboxylate or quaternary ammonium carboxylate to the Bismuth carboxylate is between 44 to 1 and 50 to 1; wherein the use level of potassium carboxylate is 2.5-3.5% by weight of the total resin; and wherein the use level of bismuth carboxylate is 0.2-0.3% by weight of the total resin.

* * * * *